(12) United States Patent
Happel

(10) Patent No.: US 10,166,577 B2
(45) Date of Patent: Jan. 1, 2019

(54) STORMWATER VAULT SERVICING PROCESS

(71) Applicant: Thomas H Happel, Cocoa, FL (US)

(72) Inventor: Thomas H Happel, Cocoa, FL (US)

( * ) Notice: Subject to any disclaimer, the term of this patent is extended or adjusted under 35 U.S.C. 154(b) by 17 days.

(21) Appl. No.: 15/420,254

(22) Filed: Jan. 31, 2017

(65) Prior Publication Data

US 2017/0136509 A1 May 18, 2017

Related U.S. Application Data

(62) Division of application No. 14/288,455, filed on May 28, 2014, now abandoned.

(60) Provisional application No. 61/828,958, filed on May 30, 2013.

(51) Int. Cl.
| | | |
|---|---|---|
| *E03F 5/14* | (2006.01) | |
| *B01D 21/24* | (2006.01) | |
| *B08B 9/093* | (2006.01) | |
| *B08B 9/08* | (2006.01) | |
| *E03F 5/10* | (2006.01) | |

(52) U.S. Cl.
CPC ........ *B08B 9/0933* (2013.01); *B01D 21/2472* (2013.01); *B01D 21/2483* (2013.01); *B08B 9/0856* (2013.01); *E03F 5/101* (2013.01); *E03F 5/106* (2013.01); *E03F 5/108* (2013.01); *E03F 5/14* (2013.01)

(58) Field of Classification Search
CPC ........ E03F 5/0403; E03F 5/101; E03F 5/106; E03F 5/108; E03F 7/10; E03F 5/14; B01D 21/2472; B01D 21/2483; B08B 9/0856; B08B 9/093; B08B 9/0933

USPC ........ 210/170.03, 523, 747.2, 803; 134/22.1, 134/22.18, 171

See application file for complete search history.

(56) References Cited

U.S. PATENT DOCUMENTS

| | | | | |
|---|---|---|---|---|
| 1,561,744 | A * | 11/1925 | Raymond ................ | E03F 7/10 210/532.1 |
| 2,010,540 | A * | 8/1935 | Evans ................... | E03F 7/10 210/523 |
| 2,443,721 | A * | 6/1948 | Butcher, Jr. ........... | B08B 9/093 134/24 |
| 3,191,206 | A * | 6/1965 | Hamel .................. | E03F 7/10 15/1.7 |
| 4,024,881 | A * | 5/1977 | Weiland ............ | B01D 21/2472 210/523 |
| 5,498,331 | A * | 3/1996 | Monteith .............. | E03F 5/12 210/170.03 |
| 5,613,510 | A * | 3/1997 | Proctor ................ | B08B 9/093 134/166 R |
| 6,125,865 | A * | 10/2000 | Bacon Cochrane .. | B08B 9/0933 134/169 R |
| 7,422,683 | B2 * | 9/2008 | Park .................... | E03F 5/14 210/170.03 |
| 7,686,961 | B1 * | 3/2010 | Glynne ................ | E03F 5/14 210/170.03 |

(Continued)

*Primary Examiner* — Christopher Upton
(74) *Attorney, Agent, or Firm* — William M. Hobby, III

(57) ABSTRACT

A stormwater vault and a process for servicing the stormwater vault speeds the process of cleaning a stormwater vault. The stormwater vault has a built in liquefaction system for liquefying settled debris in the vault which works together with a sloped or angled floor in the vault. The settled debris is flushed toward the inlet to a vacuum removal line inserted into the vault through an access opening for removing the settled debris from the vault.

9 Claims, 14 Drawing Sheets

(56) References Cited

U.S. PATENT DOCUMENTS

| | | | | |
|---|---|---|---|---|
| 7,959,741 B2* | 6/2011 | Green | ............. | B08B 9/0933 134/22.1 |
| 2008/0006304 A1* | 1/2008 | Treherne | ............. | B01D 21/2472 210/513 |
| 2013/0264257 A1* | 10/2013 | Anderson | ............. | E03F 5/0403 210/170.03 |
| 2015/0265946 A1* | 9/2015 | Hur | ............. | B01D 21/2472 210/533 |

* cited by examiner

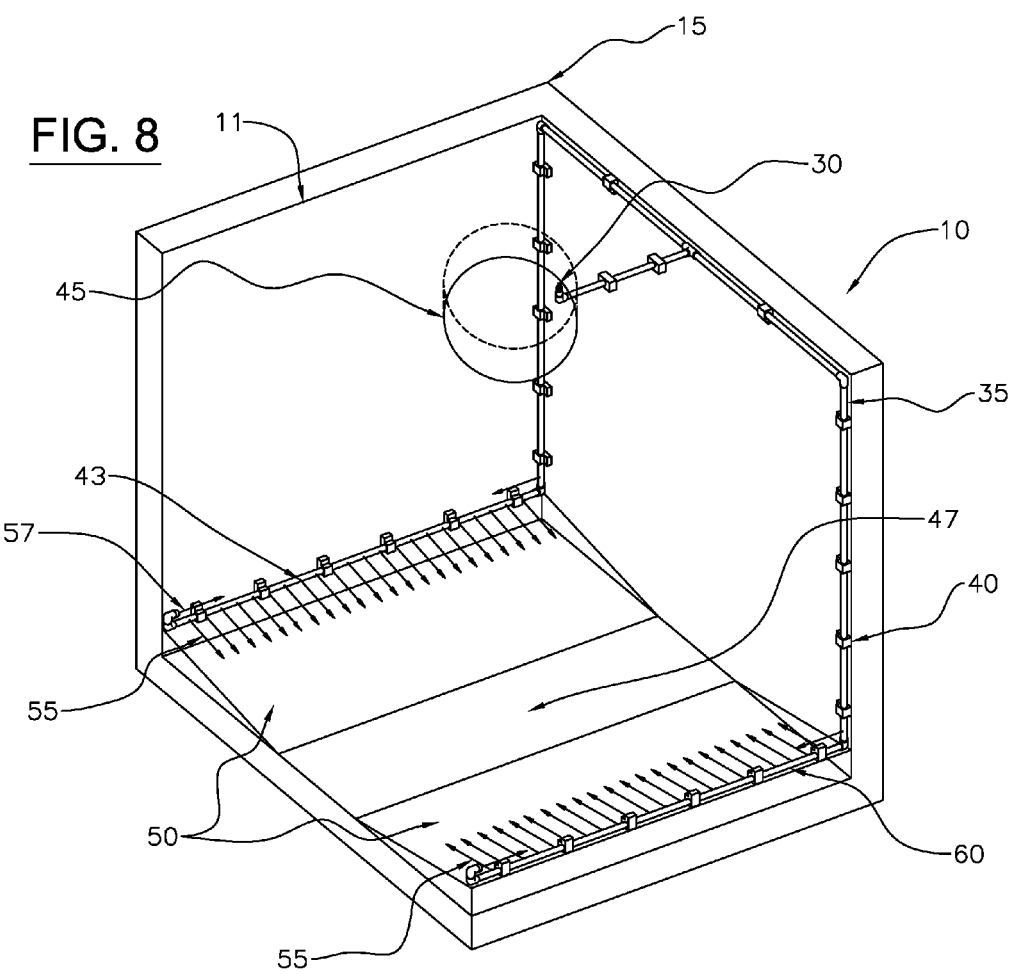

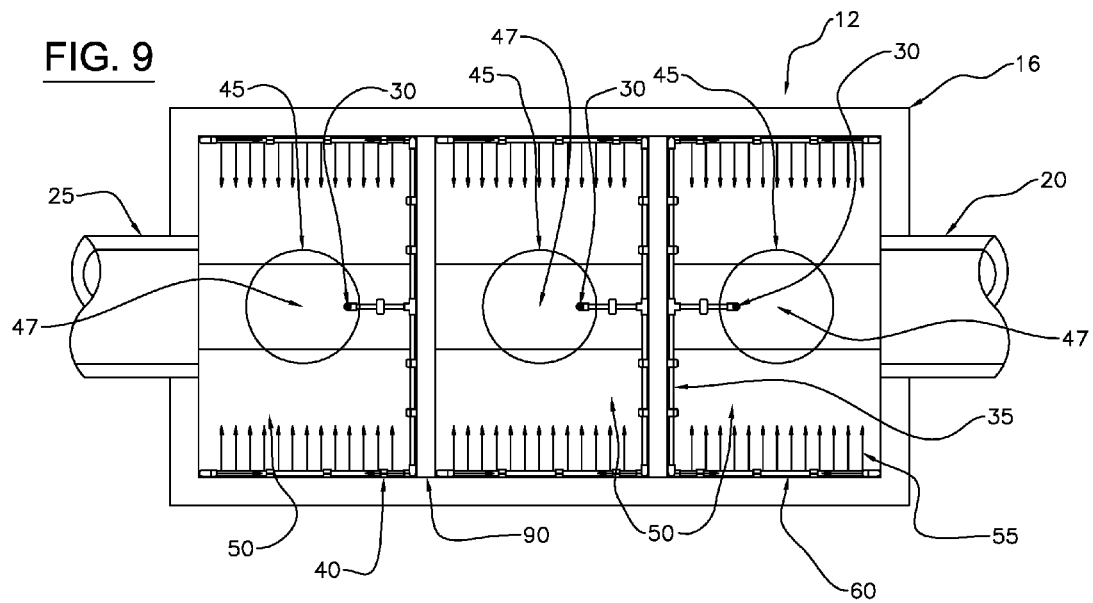
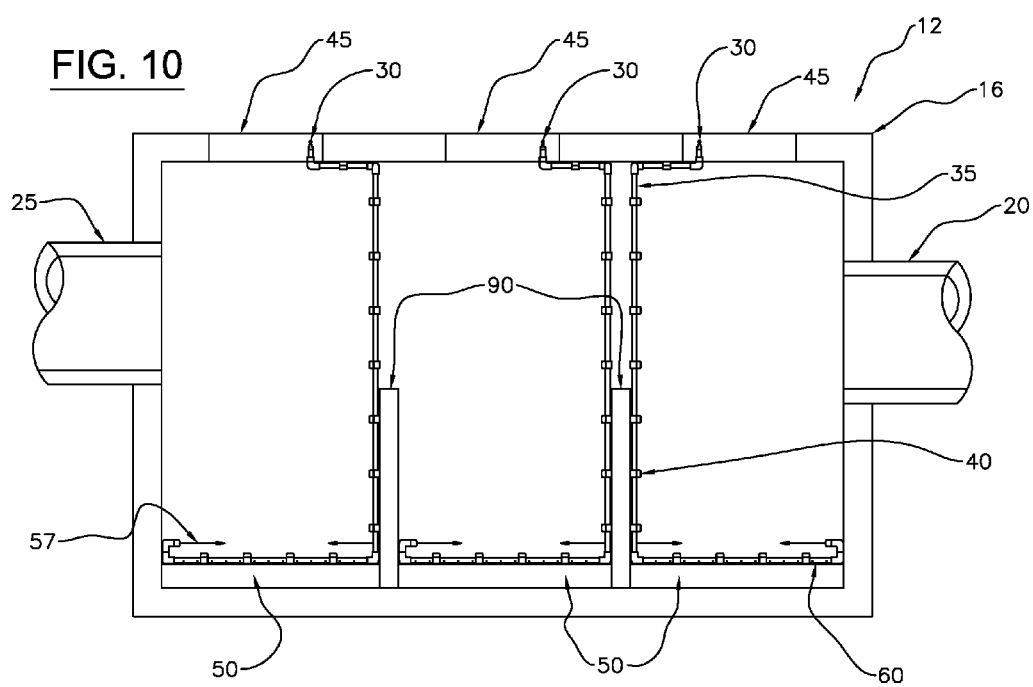

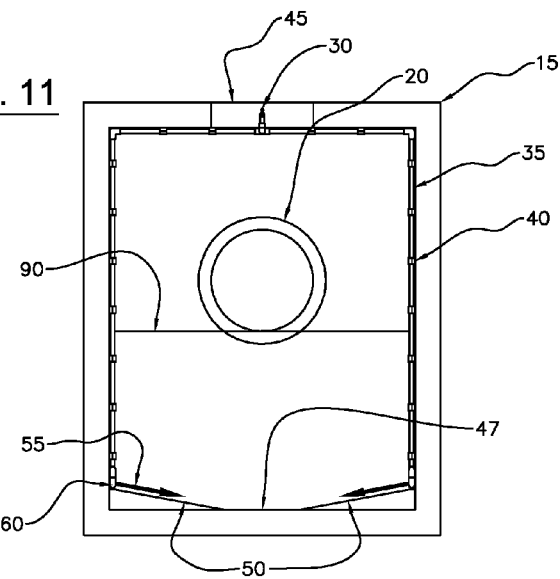
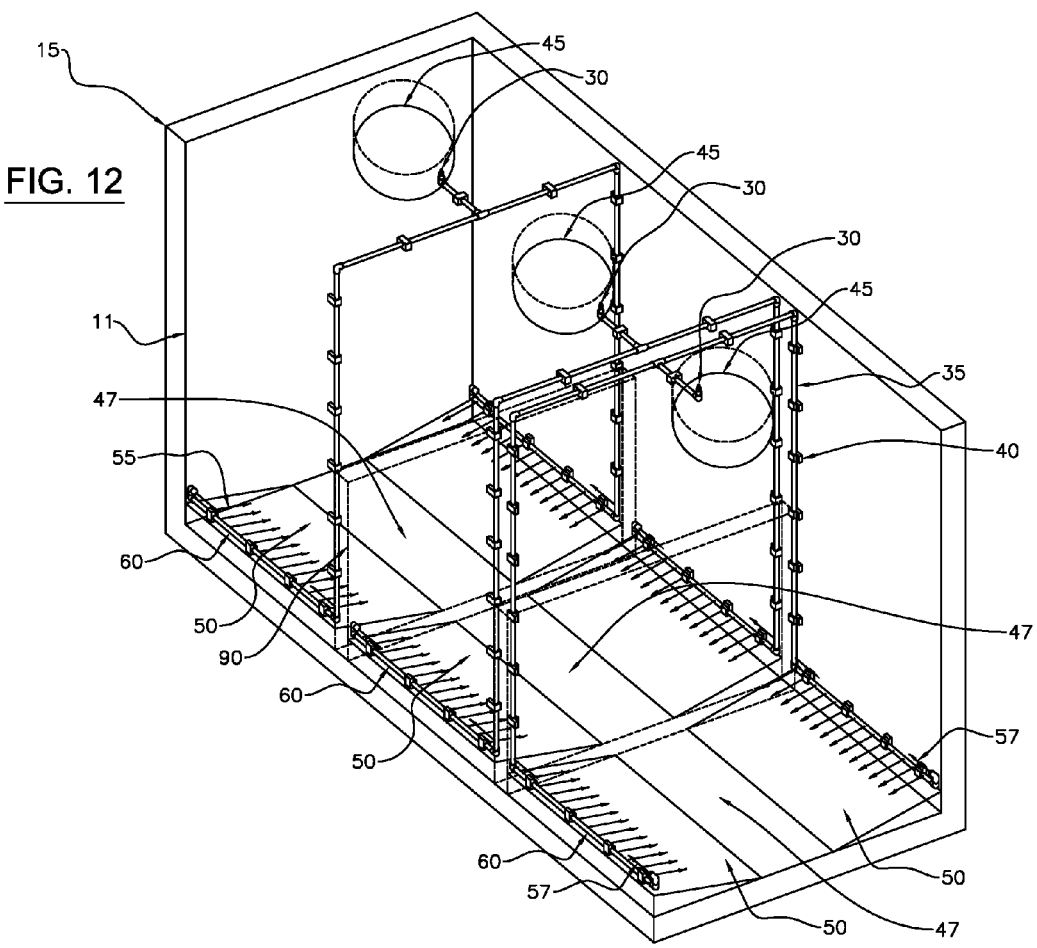

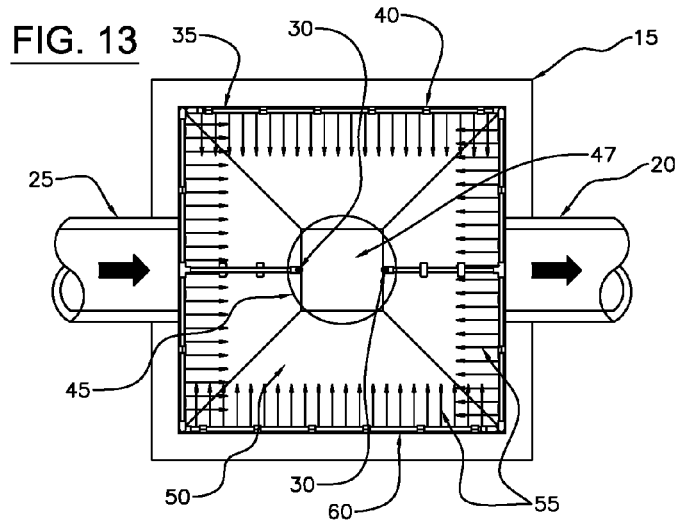
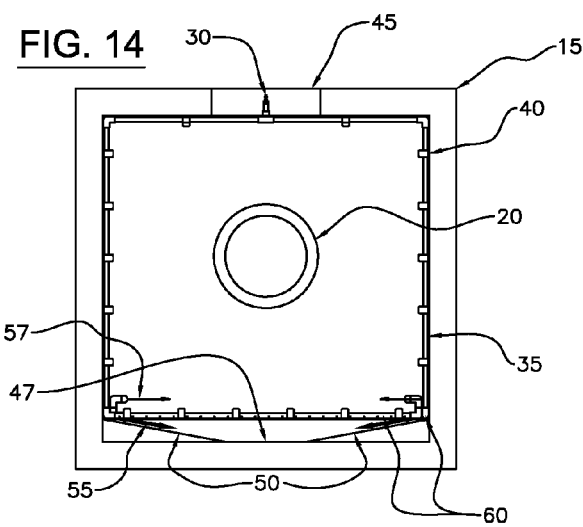
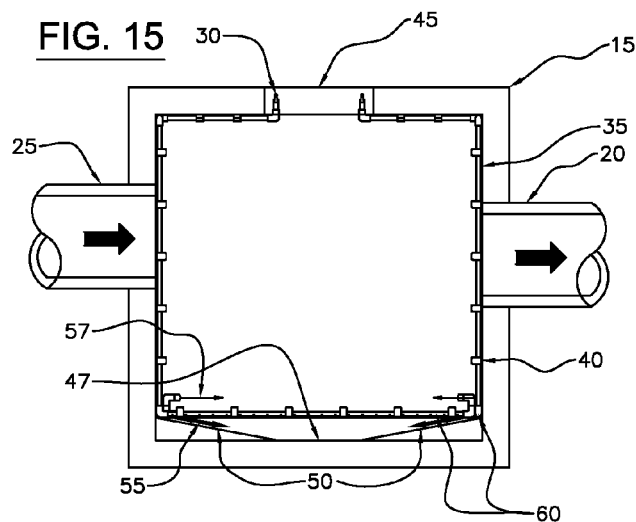

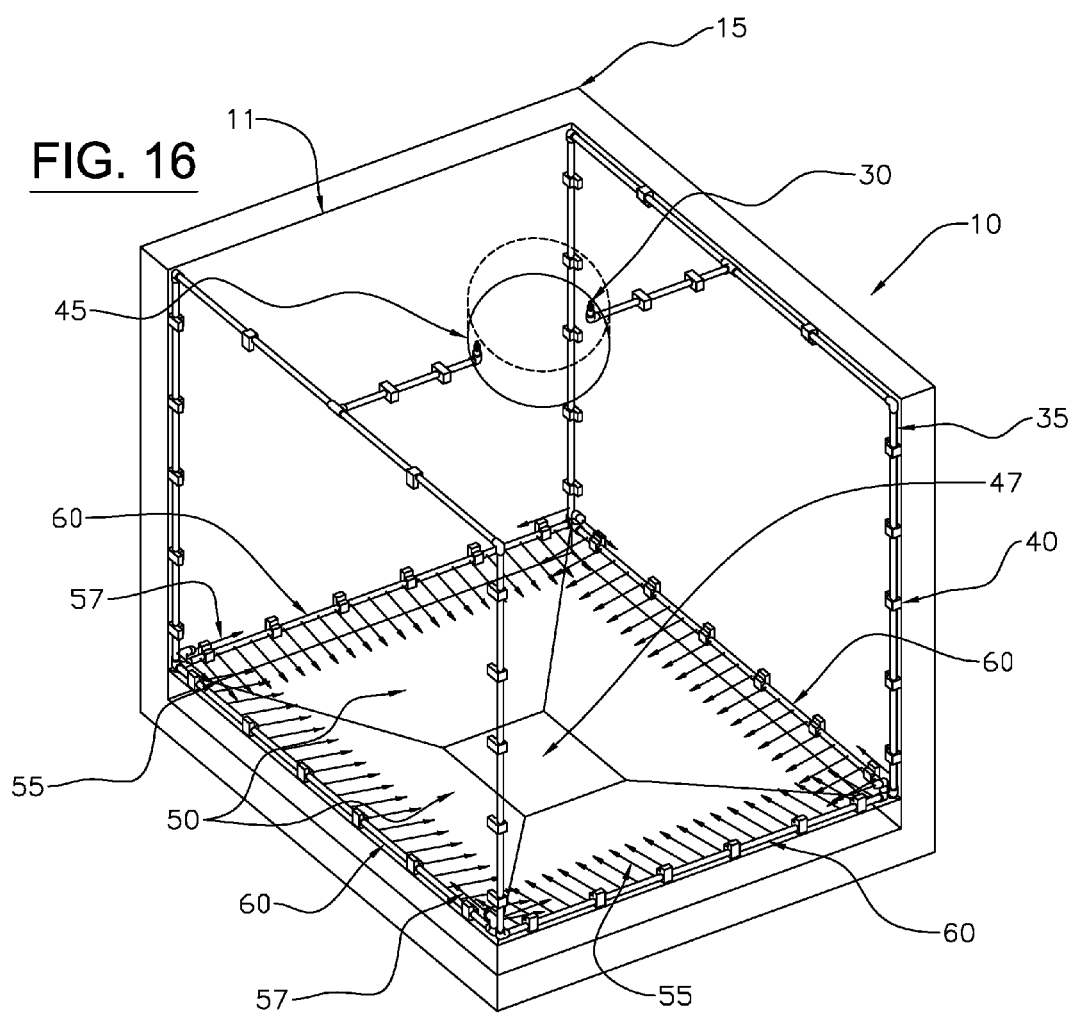

STORMWATER VAULT SERVICING PROCESS

This is a divisional application of U.S. patent application Ser. No. 14/288,455, filed Mary 28, 2014 for STORMWATER VAULT APPARATUS AND SERVICING PROCESS, which application claims the benefit of U.S. Provisional Application No. 61/828,958, filed May 30, 2013 for Stormwater Vault Apparatus and Servicing Process.

BACKGROUND OF THE INVENTION

Stormwater treatment systems typically remove solids from stormwater flow. These solids represent a major portion of the pollutant load contained in stormwater runoff. Current federal, state, and local stormwater treatment guidelines require that all stormwater runoff receive treatment to prevent the conveyance of pollution to downstream receiving water bodies.

In an attempt to quantify the effectiveness of stormwater treatment solutions, the debris collected in devises that treat stormwater is removed during servicing and analyzed. A major factor in determining the effectiveness of a stormwater treatment devise is the amount by weight of the debris removed during servicing. Therefore the greater the amount of debris removed from a devise by weight increases its effectiveness.

Servicing a stormwater treatment devise requires both human, equipment, and financial resources. Being able to service frequently will yield the capture of more debris, and being able to service quickly with a minimum human and investment will reduce the investment of servicing. In addition, because the environment of stormwater treatment systems is dynamic with the potential of flowing water during servicing, servicing quickly can make a major difference as to whether or not a devise is serviceable.

Another issue in servicing is the need to accomplish servicing without having to enter the vault of the stormwater treatment system. It is typical to send a person into a stormwater treatment vault with a handheld spray wand to flush debris toward a mobile vacuum system that removes the debris to a truck. Confined space guidelines set by OSHA dictate that when a person enters a confined space, such as a stormwater vault of a stormwater treatment system, the person entering the vault should be certified to do so and that special safety equipment must be present. Not just anyone can do confined space work and the safety routines can be complicated. The confined space issue can be a barrier to accomplishing the servicing of a stormwater treatment system.

It is typical for a vacuum service truck to have a water supply in an onboard tank that is used to flush debris as needed and generally wash things off. However, the supply of water on the vacuum truck is limited and can run out during the servicing of a stormwater treatment system. If the vacuum truck has to leave the service site to restock its water tank, the loss of time can be significant. To abandon the site to restock the water tank would not only take time but would require the treatment system to be closed up and secured out of safety concerns to the public. In addition, water intrusion into the treatment system while the vacuum truck was away would have to be dealt with which would take additional time and resources.

The present stormwater treatment vault is designed to increase the speed of servicing, use less water to do the servicing, and not require a person to enter the stormwater treatment vault to do the servicing. A primary feature that makes this all possible is the liquefaction of the captured debris from a spray system underneath the collected debris in a vault shaped to direct the debris to a collection point to be removed by a vacuum line.

SUMMARY OF THE INVENTION

A stormwater vault has a vault housing having an interior chamber having an upper and lower chamber portion and having a stormwater inlet thereinto and an outlet therefrom. The vault housing has an access entrance thereinto. A water pipe having a plurality of outlets therefrom is mounted in the bottom portion of the vault housing interior chamber, such as around the periphery of the chamber, and is positioned for liquefying and flushing debris that has settled on the bottom portion of the vault chamber. A supply pipe is located in the vault housing interior chamber and is connected to the water pipe. The supply pipe has a water line coupling thereon positioned for coupling to a water line from outside the vault housing. This allows a vacuum truck with a high pressure water source to insert a vacuum removal line into the vault and to couple a high pressure water line to the supply pipe vacuum out settled debris and to liquify debris with high pressure water while cleaning debris from the vault chamber. The bottom of the vault chamber has an angled surface, which may be a plurality of slanted bottom portions, or a truncated cone bottom forming a funnel shape or the like, for the settled debris to be directed towards a center area under the inlet to the vacuum hose.

A method of cleaning a stormwater vault includes the steps of selecting a stormwater vault having an interior chamber having an upper and lower chamber portion and having a stormwater inlet thereinto and an outlet therefrom. The vault housing has an access entrance thereinto and a water pipe having a plurality of outlets therefrom mounted in the bottom portion of the vault chamber around the periphery thereof for flushing debris settled in the vault chamber. A supply pipe is located in the vault chamber and connected to the water pipe and has a water coupling thereon positioned for coupling a high pressure water line thereto from outside the vault. The process continues by opening the vault access entrance and inserting a vacuum suction line having an inlet end for drawing settled debris from the vault. A water line is then connected to the water pipe water coupling and water under pressure is applied into the water pipe to spray water in the bottom of the chamber to liquify and move the settled debris in the vault chamber towards the vacuum inlet to withdraw the debris from the vault. The selected vault has an angled which may be several slanted surfaces for settled debris in the bottom of the vault or may a truncated cone or funnel shape.

BRIEF DESCRIPTION OF THE DRAWINGS

The accompanying drawings, which are included to provide further understanding of the invention and are incorporated in and constitute a part of the specification, illustrate embodiments of the invention and together with the description serve to explain the principles of the invention.

FIG. 8 is a partial perspective view of the stormwater vault of FIGS. 1-7 having arrows to indicate the water spray from the high pressure pipes mounted therein;

FIG. 9 is a top sectional view of a multi settling chamber stormwater vault in accordance with the present invention having arrows to indicate the water spray from the high pressure pipes mounted therein;

FIG. 10 is a top sectional view of the multi chamber stormwater vault of FIG. 9 having arrows to indicate the water spray from the high pressure pipes mounted therein;

FIG. 11 is an end sectional view of the stormwater vault of FIGS. 9 and 10;

FIG. 12 is a cutaway perspective view of the stormwater vault of FIGS. 9-11 having arrows to indicate the water spray from the high pressure pipes mounted therein;

FIG. 13 is a top sectional view of a another embodiment of a stormwater vault in accordance with FIGS. 1-8 having arrows to indicate the water spray from the high pressure pipes mounted therein;

FIG. 14 is a end sectional view of the stormwater vault of FIG. 13;

FIG. 15 is a side sectional view of the stormwater vault of FIGS. 13 and 14;

FIG. 16 is a cut-a-way perspective view of the stormwater vault of FIGS. 13-15 having arrows to indicate the water spray from the high pressure pipes mounted therein;

DETAILED DESCRIPTION OF EXEMPLARY EMBODIMENTS

Figure 1:
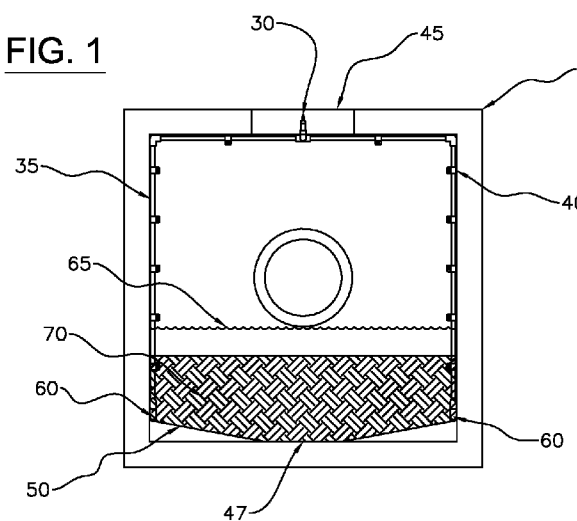
FIG. 1 is a side sectional view of a stormwater vault in accordance with the present invention with the bottom filled with sediment.

The present invention, as seen in FIGS. 1 through 8, is for a stormwater service system designed to increase the speed of servicing, uses less water to do the servicing, and does not require a person to enter the stormwater treatment vault to do the servicing. The primary feature that makes this all possible is the liquefaction of the captured debris from a spray system underneath the collected debris in a vault 15 shaped with a sloped or angled floor 50 to move the collected debris 70 for easy vacuum pickup.

A typical vault 15 has one or more access openings 45 at the top of the vault 15 for servicing the vault. Just inside the access opening 45 is a water supply connection or coupling 30 which can have water under pressure supplied by a vacuum service truck. From the water coupling point, water is conveyed from the service truck to the injection sprayers of the spray pipe 60 under the sediment via a pipe along the inside periphery of the wall of the vault housing 15. The floors 50 of the vault 15 are sloped to enable easy flushing of the settled debris or sediment 70 toward the center of the vault chamber where a vacuum line 75 has been inserted through the access opening 45 to remove the debris 70.

The following is the servicing procedure:

Step 1: Open the access opening 45 in the top of the vault 15 and attach a water supply hose to the water connection coupling 30 just inside the access opening.

Step 2: Lower the service vacuum line 75 into the vault 15 to remove the static water level over top of the sediment 70.

Step 3: Vacuum out the sediment directly under the access opening all the way to the floor of the vault to create a void within the sediment.

Step 4: Turn on the spray pipe 30 sprayers while keeping the vacuum applied to the vacuum line 75. The water being injected under the sediment will liquefy the sediment causing the sediment to slide toward the end of the vacuum line 75 to be removed.

Step 5: Once all the sediment is removed, turn off the sprayers and the vacuum.

Figure 21:
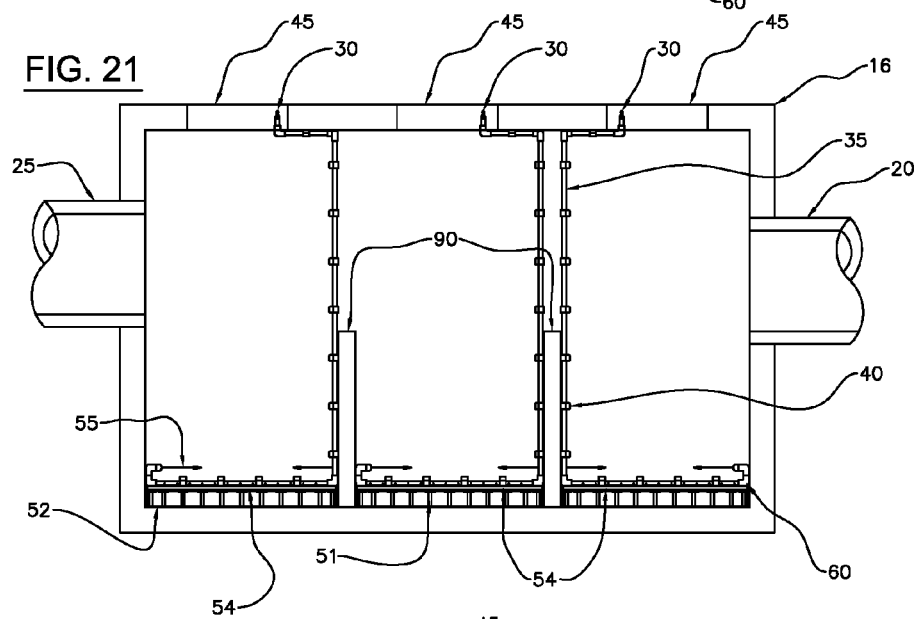
FIG. 21 is a side sectional view of a multi settling chamber stormwater vault in accordance with FIG. 20.
Figure 22:
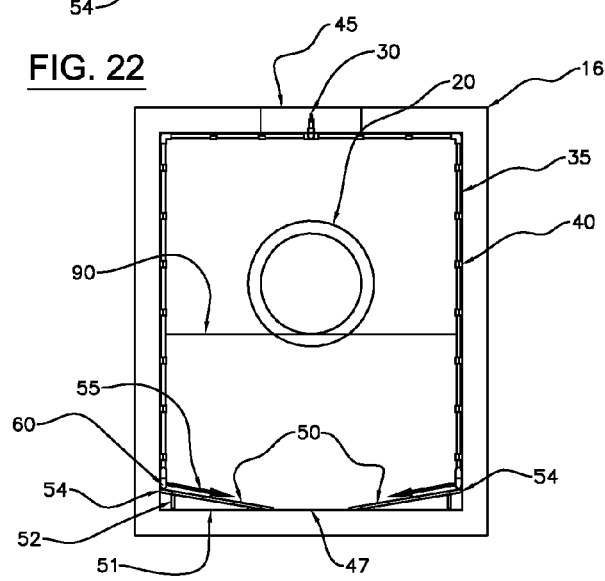
FIG. 22 is an end sectional view of the stormwater vault of FIGS. 20 and 21.
Figure 23:
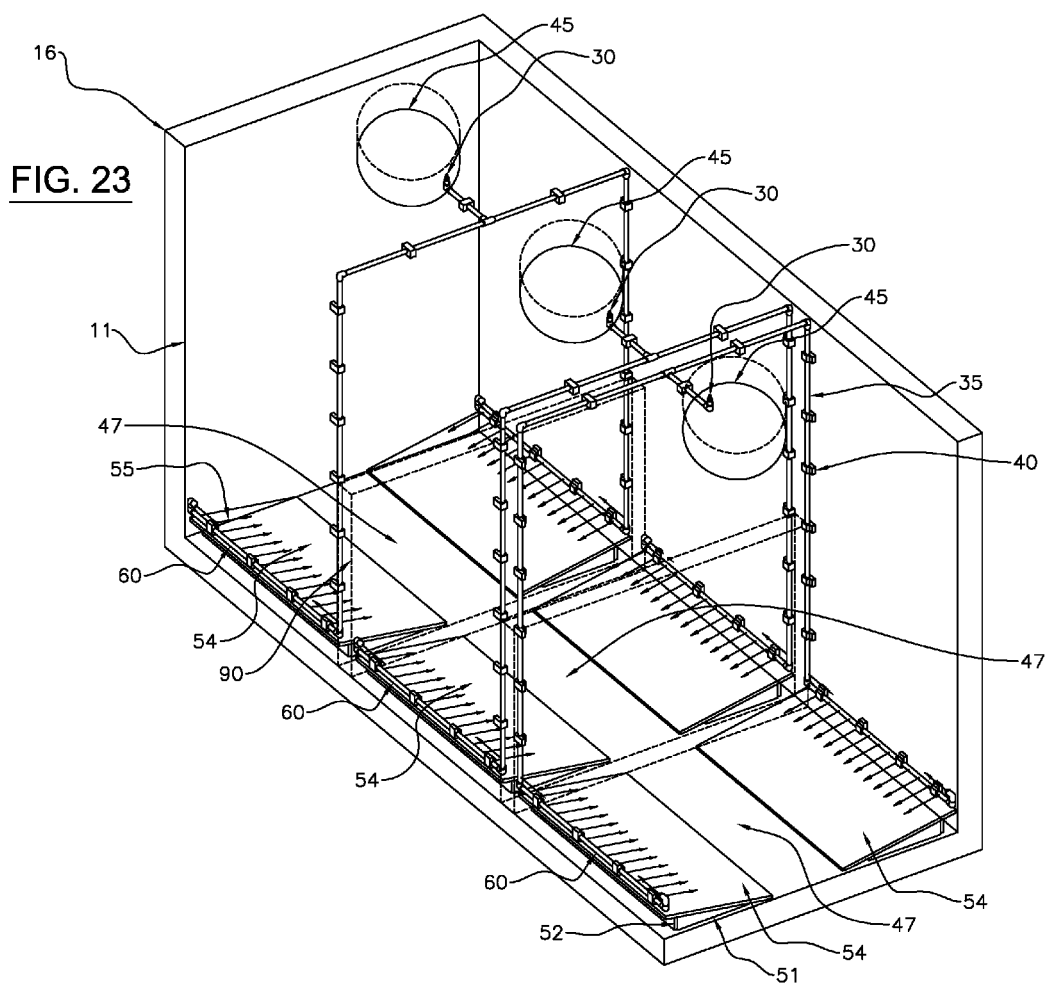
FIG. 23 is a cutaway perspective view of the stormwater vault of FIGS. 20-22 having arrows to indicate the water spray from the high pressure pipes mounted therein.

The invention can be applied to square (FIGS. 1-8), rectangular, round (FIGS. 24, 27 & 28), and oval shaped vaults or vault chambers. It can also be applied to vaults 16 that have multiple settling chambers (FIGS. 21-23). In every vault design there will always be an inlet 25 and an outlet 20 for water. However, the number and position of the inlets and outlets can vary.

FIGS. 1 through 4 demonstrates the servicing process for removing the debris 70 from the stormwater treatment vault 15. The same process will be the same regardless of the shape of the vault or if the vault has multiple chambers as illustrated in other figures. For a treatment vault 16 with multiple chambers each settling chamber is serviced in sequence. The equipment typically used to service stormwater vault systems is a vacuum truck. The vacuum truck will have a high pressure water source and a large vacuum system capable of quickly removing large quantities of debris and water from a stormwater vault. When the service truck shows up at the vault to begin servicing, the condition of the vault 15 will resemble FIG. 1. A static water level 65 will be at an elevation close to that of the outlet 20 elevation. The quantity of the captured sediment 70 within the settling chamber depends on the site criteria and varies between locations and service frequency. The floor 50 of the vault 15 is sloped toward the center 47 which is typically below the access opening 45. A high pressure pipe or hose 35 within the vault conveys water to the floor 50 spray pipe 60 along the periphery walls of the vault 15. The water conveyance begins at a water connection coupling 30 which is adjacent to the access manhole 45 for easy access. The service truck has a water source that will be equipped with a pressure water hose that can attach to the water pipe coupling 30 of pipe 35. The pipe 35 is arranged to convey water from the service truck to a spray pipe 60 along the floor 50 of the vault 15. The high pressure pipe 35 can be seen mounted to the walls of the vault with pipe supports 40. The spray pipe 60 has multiple nozzles 43, which may apertures in the pipe 60, or may have nozzles as desired, and are aimed to inject water under the sediment 70 and parallel with the sloped floors 50.

Figure 2:
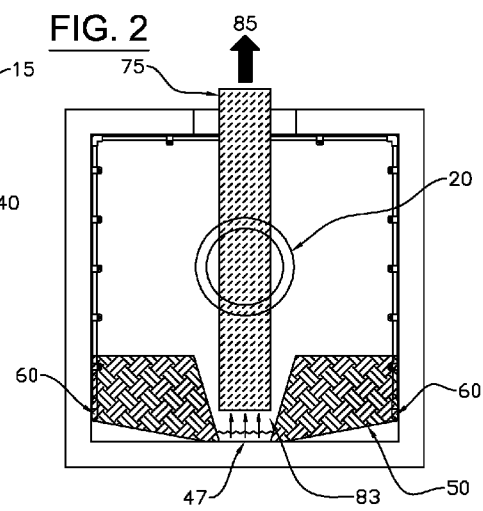
FIG. 2 is a side sectional view of the vault of FIG. 1 being serviced with a vacuum hose removing sediment from the bottom thereof.

FIG. 2 demonstrates the vacuum line 75 from a vacuum truck removing water and debris from the vault 15 before the sprayers from spray pipe 60 are turned on. The vacuum line 75 will be gradually lowered into the settling chamber removing the static water and the sediment under the access manhole 47 to create a void 83. The removed water and debris is conveyed to the vacuum truck 85.

Figure 3:
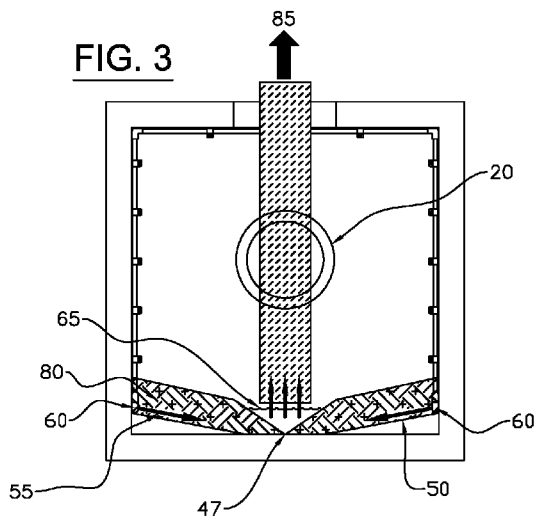
FIG. 3 is an side sectional of the vault of FIGS. 1 and 2 having bottom sediment being washed under the vacuum hose for pickup thereby.
Figure 4:
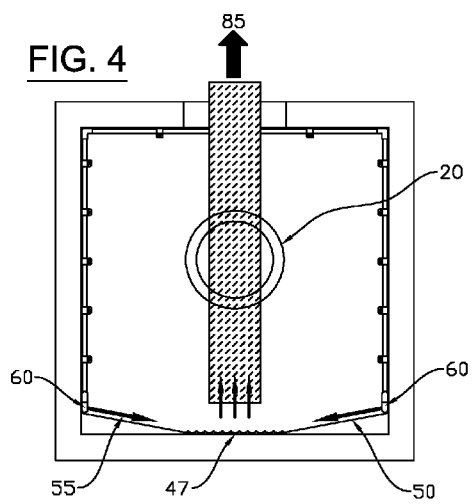
FIG. 4 is a side sectional view of the stormwater vault of FIGS. 1-3 with the sediment being removed from the bottom thereof.

FIG. 3 demonstrates the removal of the liquefied sediment 80 after the sprayer pipe 60 nozzles have been turned on. Once the sprayers have been activated with high pressure water flow, water will be injected under and into the sediment 55. The water injection will cause the sediment to become a slurry. Gravity combined with the angle of the sloped floor 50, and the water force exerted by the spray pipe 60 sprayers directs the liquefied sediment toward the inlet of the vacuum line 75 for quick and easy removal as shown in FIG. 4.

Figure 5:
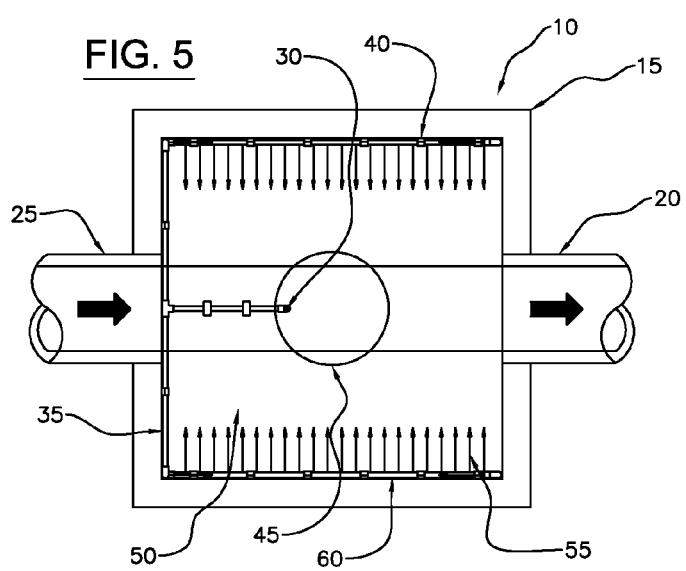
FIG. 5 is a top sectional view of the stormwater vault of FIGS. 1-4 having arrows to indicate the water spray from the high pressure pipes mounted therein.
Figure 6:
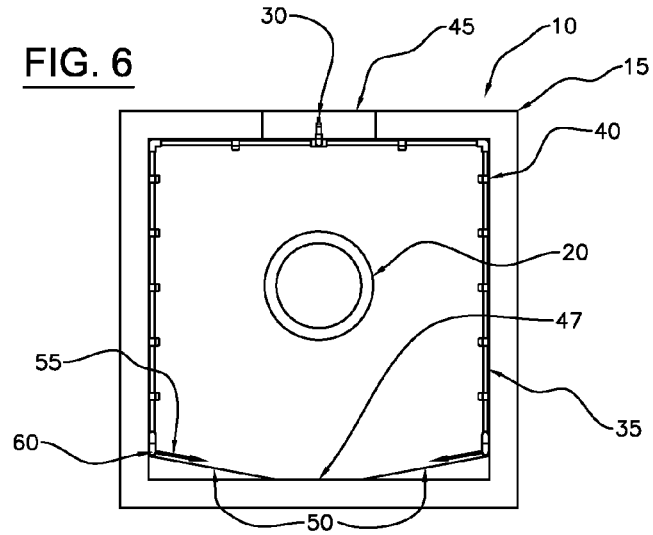
FIG. 6 is a end sectional view of the stormwater vault of FIGS. 1-5 having arrows to indicate the water spray from the high pressure pipes mounted therein.
Figure 7:
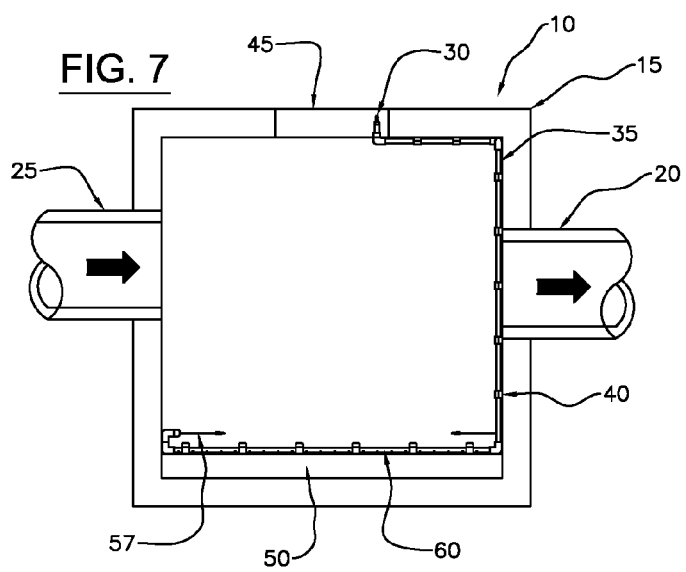
FIG. 7 is a side sectional view of the stormwater vault of FIGS. 1-6 having arrows to indicate the water spray from the high pressure pipes mounted therein.

FIGS. 5 through 8 illustrate the general arrangement of the service system for a settling chamber that is square or rectangular and has two sloped floor sections 50 which slope toward the center 47 of the chamber. The vault 10 housing 15 housing the settling chamber will have at least one inlet 25 and at least one outlet 20. Adjacent to the access manhole access opening 45 is a water connection coupling 30. The service truck attaches it's water supply to the water connection 30. A high pressure pipe 40 is used to convey water to the floor 50 of the vault chamber to a sprayer pipe 60 located along the periphery of the walls of the vault housing 15. The sloped floor 50 is angled toward the center of the chamber toward a location directly under the access manhole opening 47. FIG. 5 illustrates the injection of water 55 along the sloped floor 50. This water injection will liquefy the sediment from underneath and flush it toward the center of the chamber for easy removal by a service truck. FIGS. 7 and 8 illustrate water being injected along the wall 57. The water injection along the wall will undermine sediment that is stacked up along the wall causing it to shift over and to be influenced by the water injection along the sloped floor.

FIGS. 9 through 12 illustrate the service system in a multi-chamber vault 16. A multi-chamber vault is a vault with two or more settling chambers with at least one inlet 25 and at least one outlet 20. The service procedure would require servicing each of the settling chambers in sequence. The service truck connects to the water coupling 30 for each chamber and the vacuum is lowered into one of the chambers to remove the debris from that chamber. Once one chamber is emptied, the vacuum line is moved to the next chamber to repeat the process. Once all the chambers have been emptied, the vault servicing is complete. FIG. 9 is illustrates the direction of the various water injection nozzles. FIG. 10 is a side view and FIG. 11 an end view. The inlet 25 and outlet 20 does not have to be in the end walls of the vault. FIG. 12 is an isometric view that illustrates the walls, floors, baffles, and service system in a partial perspective.

The present service system can be adapted to settling chambers that have more than two sloped floor surfaces as illustrated in FIGS. 13 through 16 which show the use of the service system in a settling chamber that is square or rectangular in which the floor is sloped so that there are four slopes that converge toward a location under the access manhole opening 47. A spray pipe or bar 35 is located adjacent to the walls of the vault along the top of each sloped floor 50 to inject water under the sediment to liquefy the sediment and flush it toward the center of the settling chamber. Water injection 57 along the walls can take place along each of the walls. FIG. 13 is a plan view that illustrates the direction of the various water injection nozzles. The inlet and outlet openings are not limited to opposite sides of the vault. FIGS. 14 and 15 illustrate the perpendicular side views while FIG. 16 is an isometric view that illustrates the walls, sloped floors, and sprayer system in a partial perspective.

The sloped floors of the present service system can be made of any material desired. For example, because vaults are commonly made of concrete, the sloped floor of the vault can also be made of concrete. However, a concrete vault can have the sloped floor inserted as an item or section that attaches to the concrete. These attachments can be made of plastic, fiberglass, aluminum, rubber, or any other materials which is strong enough to endure the weight of water and sediment in the settling chambers. A major advantage of using sloped floor inserts is that existing vault systems quickly retrofitted. A significant disadvantage of using sloped concrete floors is the time it takes to do the concrete work. A sloped floor insert can be installed much more quickly than performing concrete work.

Figure 17:
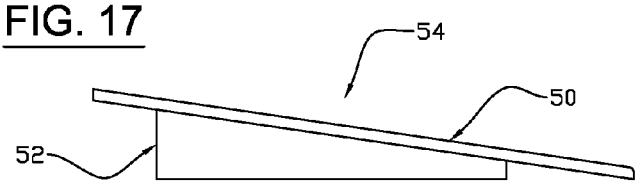
FIG. 17 is a side elevation of a sloping floor for a stormwater vault in accordance with the present invention.
Figure 18:
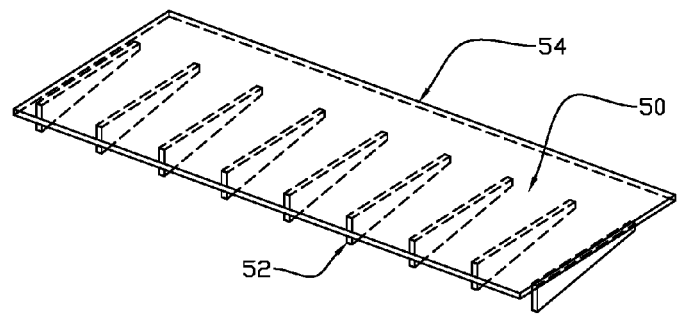
FIG. 18 is a top perspective view of the sloping floor of FIG. 17 for a stormwater vault.
Figure 19:
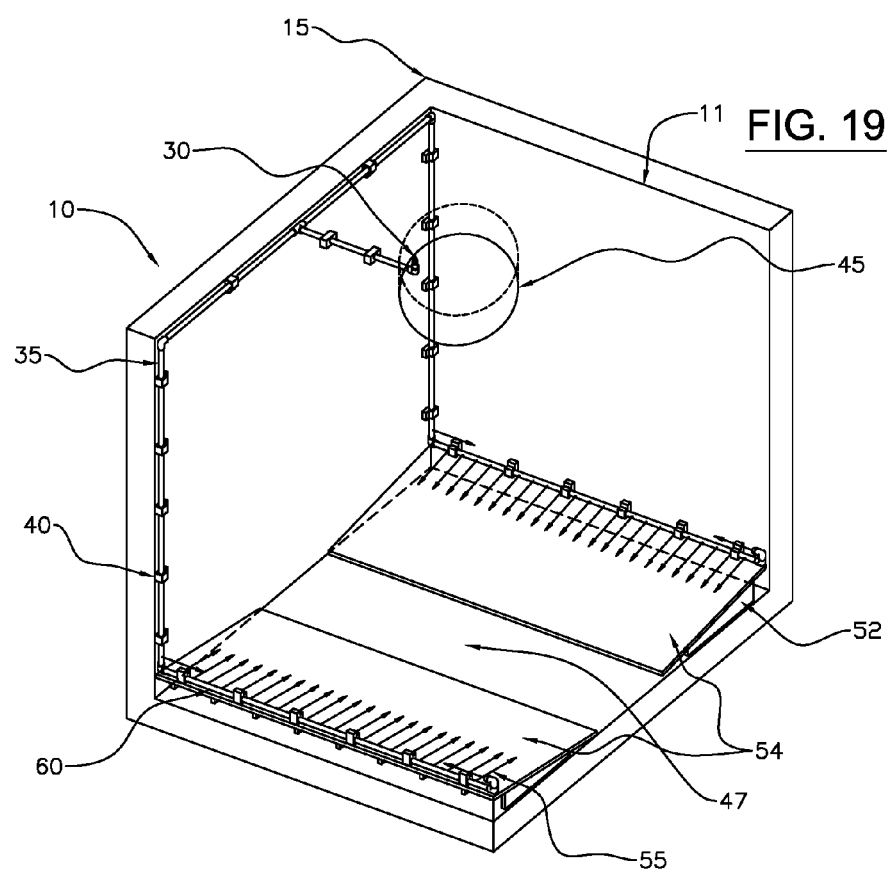
FIG. 19 is a cut-a-way perspective of the stormwater vault of FIGS. 1-8 having the sloping floor of FIGS. 17 and 18.

FIGS. 17 through 19 illustrate an insert 54 that attaches to the floor of a concrete vault 10 that slopes the floor as required by the service system. The sloped floor 50 surface can be supported from underneath by a series of supports 52. FIG. 18 illustrates how a series of floor supports 52 can be arranged to support a sloped floor panel 54. FIG. 19 illustrates how the sloped floor sections 54 can be positioned in a settling chamber and attached to the concrete with mechanical fasteners and resting on inserts 52.

Figure 20:
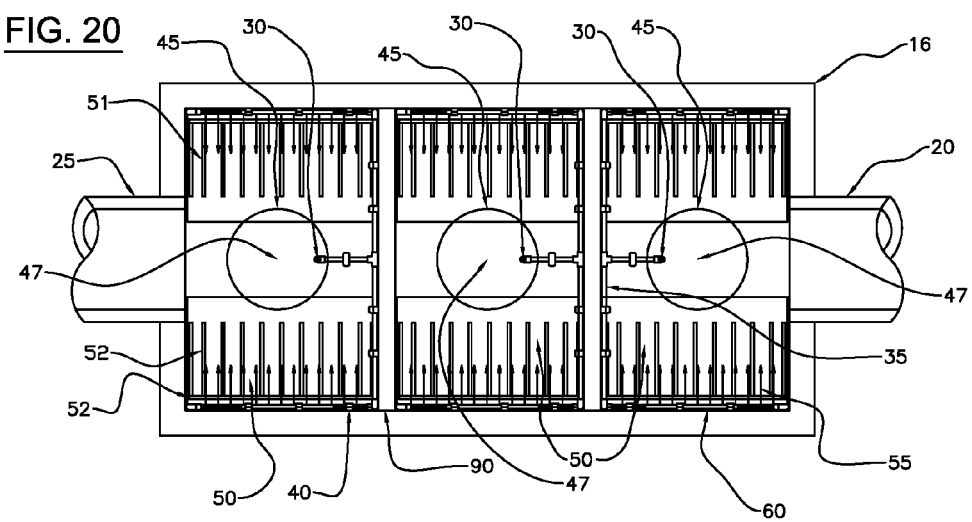
FIG. 20 is a top sectional view of another embodiment of a multi settling chamber stormwater vault having the prefab floors of FIGS. 17 and 18 and having arrows to indicate the water spray from the high pressure pipes mounted therein.

FIGS. 20 through 23 illustrate the use of sloped floor inserts in a vault with multiple settling chambers having at least two settling chambers. The sloped floor inserts attach to the concrete floors and/or walls by means of mechanical fasteners. FIG. 20 illustrates the plan view of the vault which includes the concrete vault 16, sloped floor inserts 54, and service system with arrows indicating the flow of water from the spray heads. FIG. 21 is a side sectional view of the vault of FIG. 20 and FIG. 22 is the end sectional view of the vault 16. The inlet and outlet openings are not limited to the ends of the vault but any number of inlets and outlets can be positioned as desired. FIG. 23 includes a partial cut-a-way perspective of the multi-chamber vault system of FIGS. 20 through 22.

The sloped floor inserts 54 can be arranged so that with any number of sloped inserts for each settling chamber and a single insert can include more than one slope. For example, a single insert section can have four slopes that converge to a location under the access manhole opening 47.

The sloped floor inserts do not have to be square or rectangular settling chambers. A round vault with a round settling chamber can have sloped floor inserts also. In addition, the sloped floor inserts can be made of a solid material such as recycled plastic or rubber or any material desired.

Figure 24:
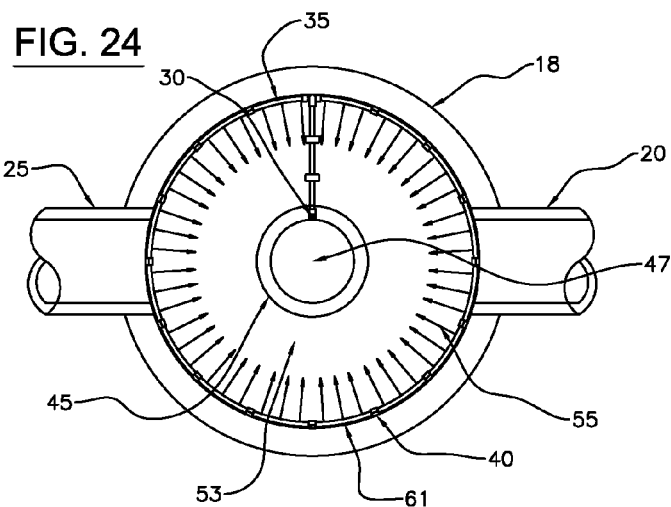
FIG. 24 is a top sectional view of another embodiment of the present invention having a cylindrical stormwater vault.
Figure 25:
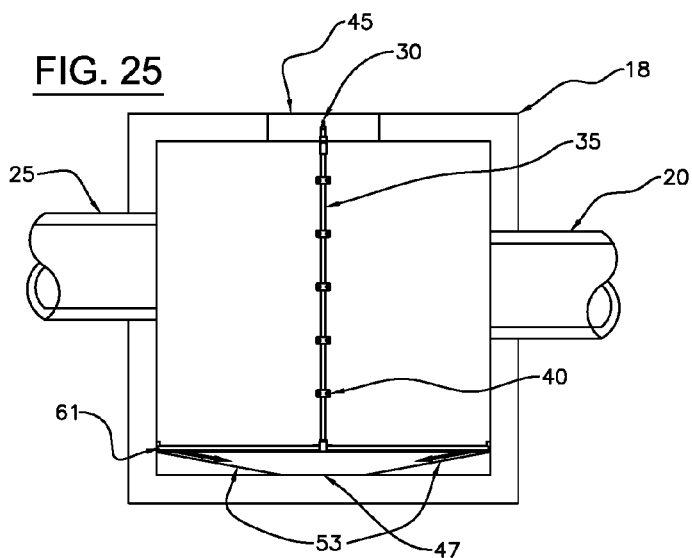
FIG. 25 is a side sectional view of the stormwater vault of another embodiment having a curved bottom.
Figure 26:
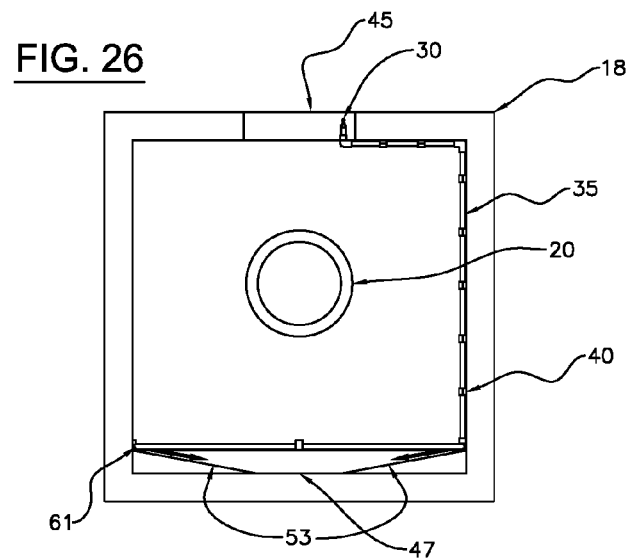
FIG. 26 is a side sectional view of the stormwater vault of FIG. 25.
Figure 27:
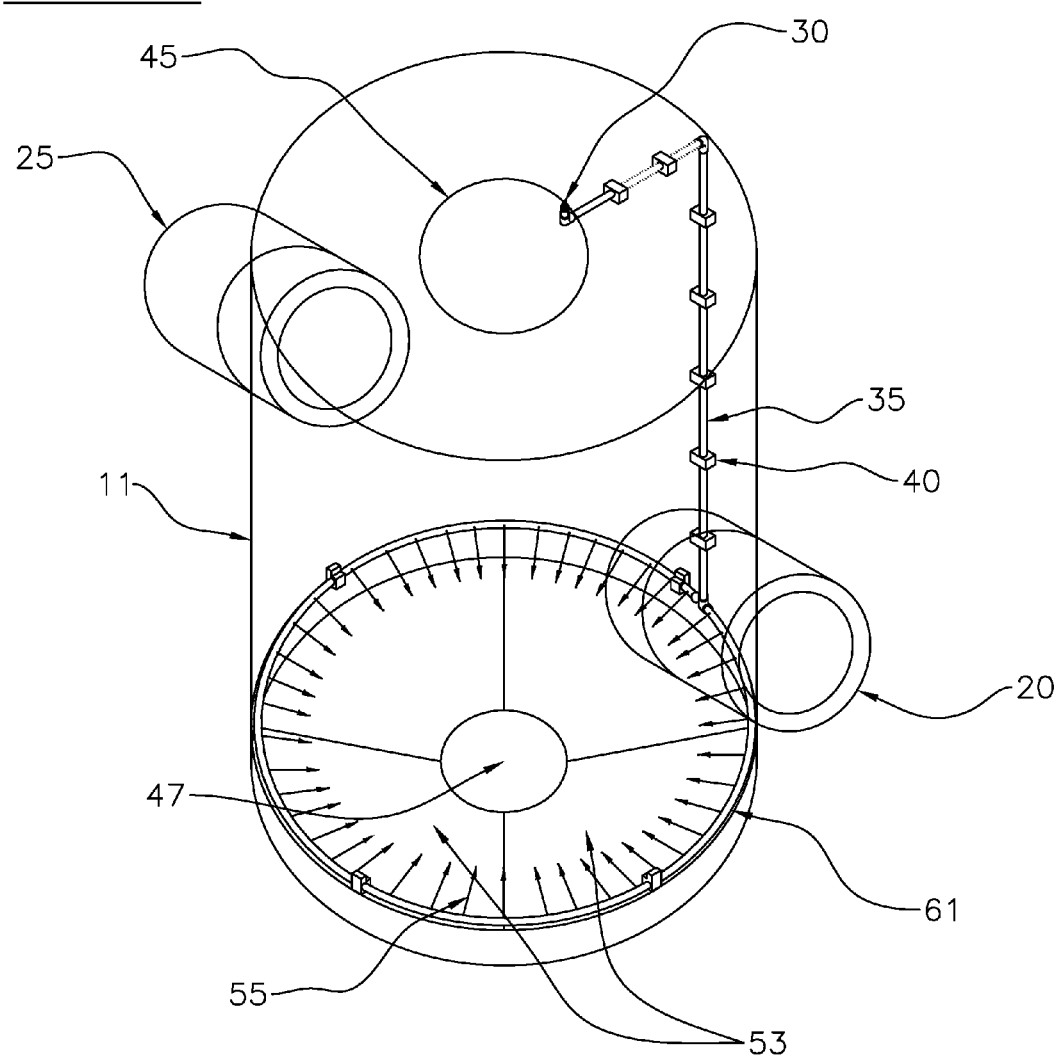
FIG. 27 is a cut-a-way perspective view of the cylindrical stormwater vault of FIG. 24.

The service system is not limited to square or rectangular vaults. The service system can be adapted to round vaults with round settling chambers. FIGS. 24 through 27 illustrate the use of the service system vault 18 with round settling chambers. The floor 53 of the vault can be sloped by either forming the floor with a slope or by using an insert that attaches to the vault. The sloped floor can be in of a generally truncated cone shape centered on the area 47 under the access opening to the vault. The inlet and outlet openings 25 and 20 are not limited in number or to opposite sides of the vault 18. It is common for round vaults to have the inlet opening in a direction that is tangent to the inside wall of a round vault. Round vaults can also have a concave sloped floor 53. In round vaults the sprayer pipe 61 is located at the top of the slope along the periphery of the wall and of the floor. The water coupling 30 is located adjacent to the access manhole opening 45 and a high pressure pipe or hose 35 is used to convey water flow to the floor of the vault. When the water supply is turned on from the service truck the spray pipe will spray water 55 along the floor of the vault to liquefy the sediment and cause it to flush toward a point under the access manhole 47 where it will be removed by a vacuum service truck. FIG. 24 is a top sectional view that illustrates the round shape of the vault and the direction of the water injection along the sloped floor. FIGS. 25 and 26 are side and top sectional views of the round vault that show the configuration of the service system plumbing and the sloped floors. FIG. 27 is a partial cut-a-way perspective of the inside surface of the round vault 18, showing the configuration of the service system, sloped floors 53, and the direction of the water injection 55 from the spray pipe 61 along the sloped floor 53 toward the location 47 under the access manhole opening 45.

Figure 28:
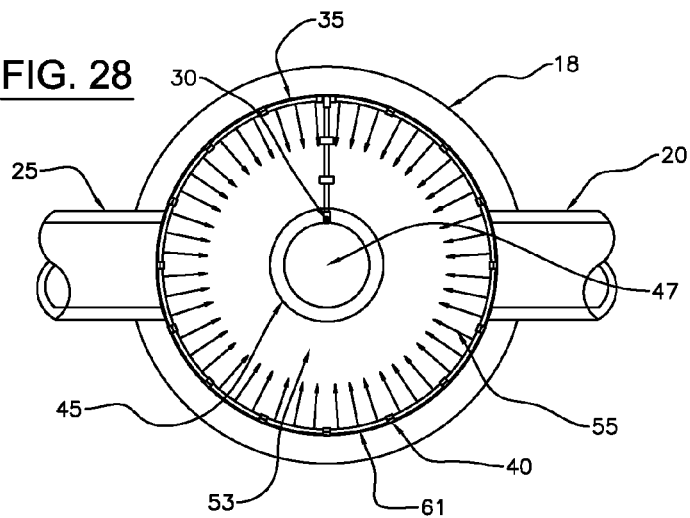
FIG. 28 is a top sectional view another embodiment of a cylindrical stormwater vault.
Figure 29:
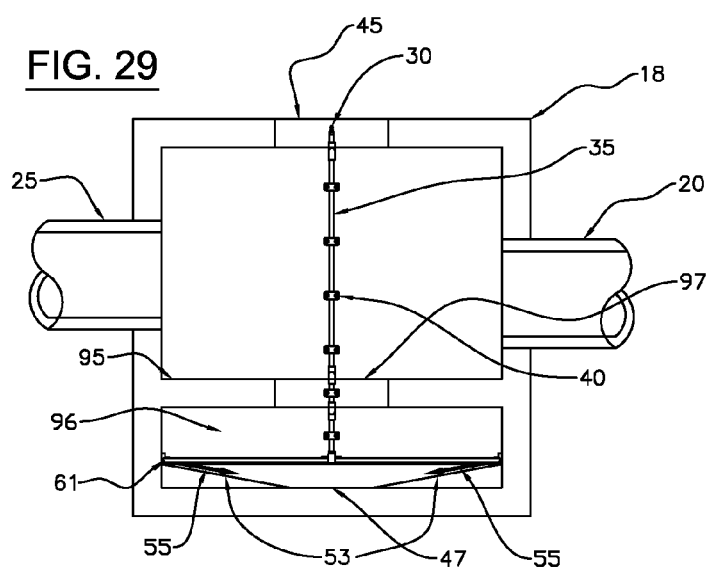
FIG. 29 is a side sectional view of the cylindrical stormwater vault of FIG. 28.
Figure 30:
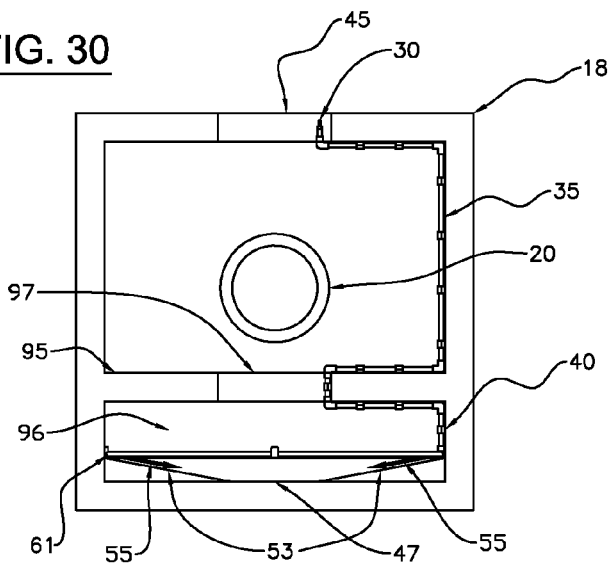
FIG. 30 is a second side sectional view of the cylindrical stormwater vault of FIGS. 28 and 29.
Figure 31:
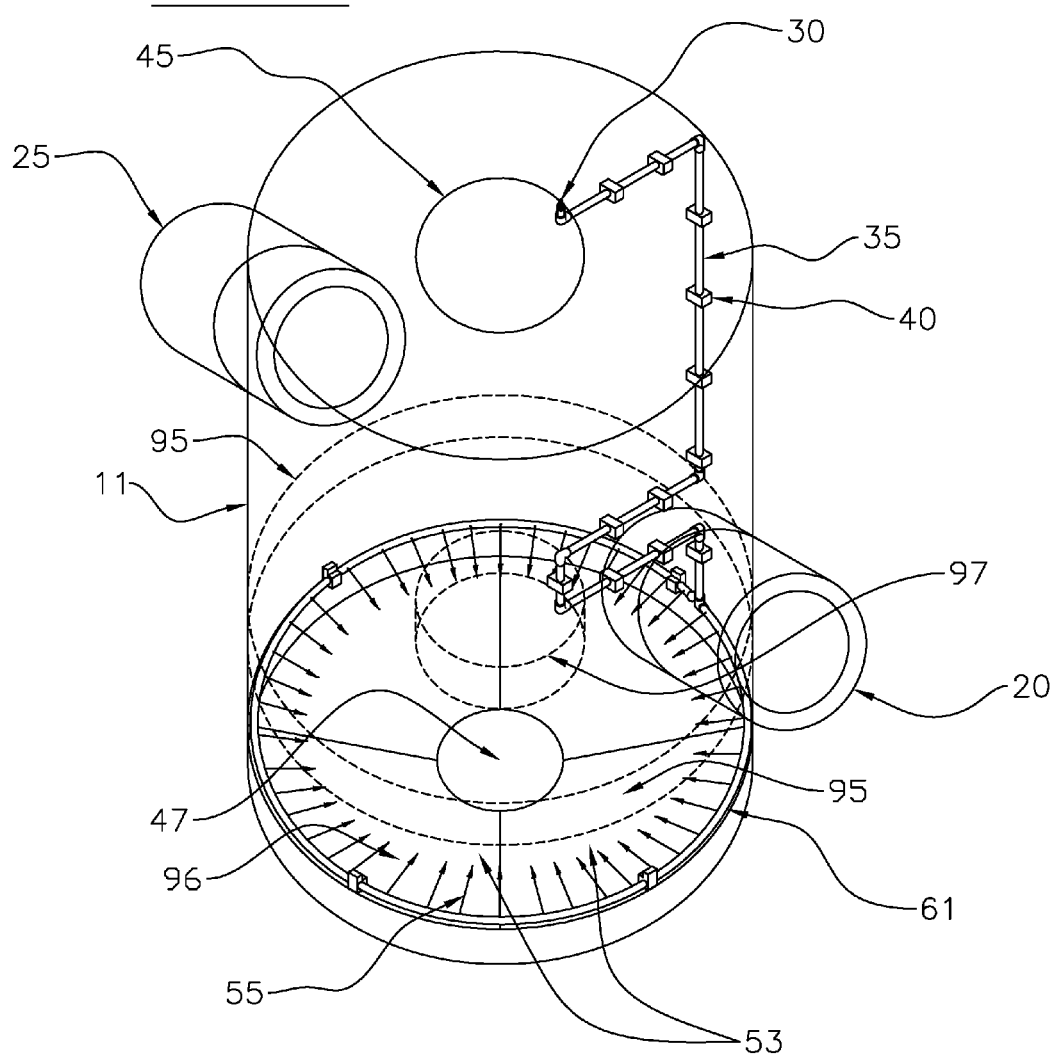
FIG. 31 is a cut-a-way perspective view of the cylindrical stormwater vault of FIGS. 28-30.

In round treatment vault systems the settling sump is often separated from the flow above by a horizontal shelf. The horizontal shelf will typically have an opening for sediments to settle through and for a service truck to access and vacuum out the captured sediments. The settling chambers of round vaults with horizontal shelves are especially difficult to service because the horizontal shelf restricts access to the settling chamber. FIGS. 28 through 31 illustrate the service system in a round treatment vault 18 with a horizontal shelf or ledge 95 above the settling chamber. FIG. 28 is a top sectional view that illustrates the round vault 18 and the direction of the water injection along the sloped floor 53. The inlet and outlet openings 25 and 20 are not limited to opposite sides of the vault. It is common for round vaults to have the inlet opening enter in a direction that is tangent to the inside wall of the vault. FIGS. 29 and 30 illustrate side sectional views of the round vault 18 with a horizontal shelf 95 forming a settling sump chamber 96 with a service port 97 and the plumbing of the service system. FIG. 31 is a partial perspective of the inside surface of the round vault 31 with the horizontal shelf 95 having an service port opening 97 and forming a settling sump chamber.

It should be clear at this time that an improved stormwater vault and stormwater vault servicing process have been provided which advantageously allows for a faster and more efficient and safer cleaning of stormwater vaults. However, it should be clear that the present invention is not to be considered as limited to the forms shown which are to be considered illustrative rather than restrictive.

I claim:

1. A method of cleaning a stormwater vault comprising the steps of:

selecting a stormwater vault having a periphery wall and a floor to form an interior chamber having an upper and lower chamber portion and having a stormwater inlet thereinto and an outlet therefrom, said vault floor having a downwardly sloped section extending from said periphery wall towards a central pickup area, said vault having an access entrance thereinto and having a water spray pipe having a plurality of spaced outlets therefrom mounted around the periphery of said vault interior chamber adjacent said sloped floor section, said outlets being aimed along the surface of said downwardly sloped floor sections for flushing debris settled in said vault interior chamber toward said central pickup area and a water supply pipe located in said vault interior chamber and connected to said water spray pipe and having a water coupling thereon positioned for attaching a water line thereto from outside said vault;

opening said vault access entrance;

inserting a vacuum suction line having an inlet end for drawing materials thereinto from said vault interior chamber through said access entrance;

withdrawing sediment in the bottom portion of said vault interior chamber beneath said inserted vacuum line;

connecting a water supply line to said water pipe coupling; and applying water under pressure into said water spray pipe to spray water out said water spray pipe outlets to liquify and move the sediment in said vault interior chamber towards said vacuum inlet to withdraw the moved sediment from said vault.

2. The method of cleaning a stormwater vault in accordance with claim 1 including the step of turning off the water from said water line and removing said vacuum suction line from said vault upon removal of settled debris therefrom.

3. The method of cleaning a stormwater vault in accordance with claim 1 in which the step of selecting a stormwater vault having a downwardly sloped floor section includes selecting a vault having a generally concave sloped floor section.

4. The method of cleaning a stormwater vault in accordance with claim 1 in which the step of selecting a stormwater vault having a downwardly sloped floor section includes selecting a vault having at least two downwardly sloped floor sections for driving settled debris towards the central pickup area.

5. A method of cleaning a stormwater vault comprising the steps of:

selecting a stormwater vault having a periphery wall and a floor to form an interior chamber and having a stormwater inlet thereinto and an outlet therefrom, said vault floor having a downwardly sloped floor insert attached thereto adjacent said vault periphery wall and sloped towards a central pickup area, said vault having an access entrance thereinto and having a water spray pipe having a plurality of spaced outlets therefrom attached to the periphery wall adjacent said attached sloped floor insert and having the outlets therefrom aimed along the surface of said downwardly sloped floor insert for flushing debris settled in said vault interior chamber toward said central pickup area and a water supply pipe operatively coupled to said water spray pipe and extending towards said vault access entrance;

applying water under pressure into said water supply pipe and to said water spray pipe to spray water out said water spray pipe outlets to liquify and move the sediment in said vault interior chamber toward said central pickup area;

inserting a vacuum suction line through said vault access entrance into said vault; and withdrawing sediment in the bottom portion of said vault interior chamber through said vacuum suction line.

6. The method of cleaning a stormwater vault in accordance with claim 5 in which said attached sloped floor insert includes a flat surface having angled supports there beneath.

7. The method of cleaning a stormwater vault in accordance with claim 6 in which said sloped floor insert is attached to said vault floor with mechanical fasteners.

8. The method of cleaning a stormwater vault in accordance with claim 6 in which said sloped floor insert is adhesively attached to said vault floor.

9. The method of cleaning a stormwater vault in accordance with claim 6 in which said sloped floor insert is made of a polymer.

* * * * *